(12) United States Patent
Zhao et al.

(10) Patent No.: US 12,422,349 B2
(45) Date of Patent: Sep. 23, 2025

(54) BRIDGE SLING BASED ON ELECTROCHEMICAL DETECTION ON STEEL WIRE CORROSION AND PROCESSING METHOD THEREFOR

(71) Applicants: CHINA RAILWAY CONSTRUCTION BRIDGE ENGINEERING BUREAU GROUP CO., LTD., Tianjin (CN); Shenyang University of Technology, Shenyang (CN)

(72) Inventors: Jian Zhao, Tianjin (CN); Peng Liu, Panjin (CN); Luming An, Hengshui (CN); Hongping Lu, Zhucheng (CN); Guannan Zhou, Tianjin (CN); Yuanqing Wang, Beijing (CN); Lilong Fan, Tianjin (CN); Gang Chen, Luzhou (CN); Meiyu Chen, Guangzhou (CN); Yixuan Chen, Dezhou (CN); Xianyu Ji, Gaobeidian (CN)

(73) Assignee: CHINA RAILWAY CONSTRUCTION BRIDGE, Shenyang (CN)

( * ) Notice: Subject to any disclaimer, the term of this patent is extended or adjusted under 35 U.S.C. 154(b) by 412 days.

(21) Appl. No.: 17/985,685

(22) Filed: Nov. 11, 2022

(65) Prior Publication Data
US 2023/0075454 A1    Mar. 9, 2023

(51) Int. Cl.
*G01N 17/02*      (2006.01)

(52) U.S. Cl.
CPC .................................. *G01N 17/02* (2013.01)

(58) Field of Classification Search
CPC ....................................................... G01N 17/02
See application file for complete search history.

(56) References Cited

FOREIGN PATENT DOCUMENTS

| | | | | |
|---|---|---|---|---|
| CN | 201738240 U | * | 2/2011 | ............. E01D 19/16 |
| CN | 104198672 A | | 12/2014 | |
| CN | 109253969 A | * | 1/2019 | ........... G01N 17/006 |
| CN | 109632918 A | | 4/2019 | |
| CN | 110823921 A | | 2/2020 | |

OTHER PUBLICATIONS

EPO machine-generated translation Chu et al. CN 109253969 A, patent published Jan. 22, 2019 (Year: 2019).*
He et al., "Research on Durability Evaluation Method of Bridge Slings Based on Set Pair Analysis," IOP Conf. Series: Earth and Environmental Science 474 (2020) 072081 (Year: 2020).*

(Continued)

*Primary Examiner* — Alexander S Noguerola

(57) ABSTRACT

The present invention relates to the technical field of bridges, and specifically discloses a bridge sling based on electrochemical detection on steel wire corrosion. By means of winding a steel wire bundle with a wrapping tape, and coating the wrapping tape with a shielding coating, the steel wire bundle and the shielding coating are electrically connected with positive and negative electrodes of a voltage test assembly respectively, so that simple and accurate detection on corrosion in the sling during service is realized, and the safety of the sling during the service is ensured.

6 Claims, 10 Drawing Sheets

(56) References Cited

OTHER PUBLICATIONS

Chapter 2 of Cable Supported Bridges: Concept and Design, Third Edition. Niels J. Gimsing and Christos T. Georgakis. © 2012 John Wiley & Sons, Ltd. Published 2012 by John Wiley & Sons, Ltd. (Year: 2012).*

EPO machine-generated translation Chen et al. CN 201738240 A, patent published Feb. 9, 2011 (Year: 2011).*

Hamilton III et al., "Investigation of Corrosion Protection Systems for Bridge Stay Cables," Research Report No. 1264-3F, by the Center for Transportation Research Bureau of Engineering Research the University of Texas at Austin, Nov. 1995 (Year: 1995).*

Author unknown, "Strong and Versatile—vol. 1: System Applications," BBR VT CONA CMX, Dec. 2016 ; http://www.bbr-adria.com/fileadmin/bbr_network/PDFs/Brochures/BBR_CONA_CMX_Vol1_SysApp_EN_Rev3_1216.pdf (Year: 2016).*

DYWIDAG product guide for Cableskin, published Mar. 31, 2021, https://dywidag.com/services/strengthening/cable-wrapping-by-hand-and-robotic-with-cableskin; https://assets.ctfassets.net/wz1xpzqb46pe/3hTbJPe9B1ZVtnMhtiHHTs/99129f3e03713e775083b440bc4efb57/2104_Cableskin_product_guide_EN_online.pdf (Year: 2021).*

British Plastics Federation—Plastics Abbreviations, 2025, https://www.bpf.co.uk/plastipedia/abbreviations/Default.aspx (Year: 2025).*

\* cited by examiner

BRIDGE SLING BASED ON ELECTROCHEMICAL DETECTION ON STEEL WIRE CORROSION AND PROCESSING METHOD THEREFOR

TECHNICAL FIELD

The present invention relates to the technical field of bridges, and specifically relates to a bridge sling based on electrochemical detection on steel wire corrosion and a processing method therefor.

BACKGROUND

A tied-arch bridge structure has clear stress, mature construction technology and good overall engineering economy. For example, large and medium-sized bridges, especially cross-channel bridges, have been widely used. As a force-transmitting member between a bridge deck system and an arch rib or a cable tower in a bridge, a sling has great significance to the structural safety of the bridge. However, in recent years, there have been many accidents of partial or overall collapses of the bridges as a result of the corrosion failure of the slings. The reasons include design defects and construction deficiencies, and a large part is undetectable corrosion in the slings during operation of the bridges.

The existing slings of the tied-arch bridges mostly adopt finished sling products produced by manufacturers, and internal parallel steel wires are mostly used as stress components of the slings. Because of the tightness of the sling structure and the opacity of a polyester tape and a HDPE protective sleeve outside the parallel steel wires, the corrosion of the parallel steel wires inside the bridge slings in service cannot be detected. Therefore, in the existing detection method of bridge sling corrosion, generally, upper and lower anchor heads of the sling are opened, and corrosion of the sling steel wires is indirectly judged by means of appearance of the sling anchor heads and the steel wire piers, whether the lower anchor head of the sling has a water leakage, etc. This judgment method, which replaces lines with points and deduces the internal situation from exterior phenomena, has great subjectivity and are not high in reliability and accuracy of judgment results.

SUMMARY

A purpose of the present invention is to provide a bridge sling based on electrochemical detection on steel wire corrosion, which may intuitively and accurately judge whether corrosion and breakage occur to a steel wire bundle in the sling.

Another purpose of the present invention is to provide a processing method for the bridge sling based on electrochemical detection on steel wire corrosion, which may quickly process a bridge sling with a function of detecting corrosion and breakage of the steel wire bundle.

In order to achieve the purposes, a technical solution adopted by the present invention is as follows:

a bridge sling based on electrochemical detection on steel wire corrosion, comprising a steel wire bundle. The steel wire bundle is wound with a wrapping tape; the tail ends of the steel wire bundle are exposed from the wrapping tape; the wrapping tape is coated with a shielding coating; a protective assembly is sleeved outside the shielding coating; sling sealing assemblies are sleeved at the tail ends of the protective assembly; the tail ends of the sling seal assemblies are connected with an anchor cup bodies; wire separating assemblies are arranged in the anchor cup bodies; the tail ends of the steel wire bundle dispersedly penetrate through and are fixed on the wire separating assemblies; a voltage test assembly is arranged on the sling sealing assembly; and the steel wire bundle and the shielding coating are electrically connected with positive and negative electrodes of the voltage test assembly respectively.

As an improvement of the bridge sling based on electrochemical detection on steel wire corrosion, the voltage test assembly comprises a voltmeter; the positive electrode of the voltmeter is electrically connected with the steel wire bundle; and the negative electrode of the voltmeter is electrically connected with the shielding coating.

As an improvement of the bridge sling based on electrochemical detection on steel wire corrosion, the steel wire bundle is formed by stacking a plurality of steel wires in parallel; the shielding coating is an organic zinc-rich coating; and the wrapping tape is a polyester tape.

As an improvement of the bridge sling based on electrochemical detection on steel wire corrosion, the organic zinc-rich coating comprises zinc powder, a volatile solvent and resin; the zinc powder is phosphoric acid modified zinc powder; the volatile solvent is SE200 acrylic resin; the resin is acrylic resin; and the mass ratio of the zinc powder to the resin to the volatile solvent is 1:2:2.

As an improvement of the bridge sling based on electrochemical detection on steel wire corrosion, the protective assembly comprises an inner protective layer and a steel pipe; the inner protective layer and the steel pipe are sleeved outside the shielding coating from inside to outside sequentially; and the inner protective layer is made of a plastic material.

As an improvement of the bridge sling based on electrochemical detection on steel wire corrosion, each sling sealing assembly comprises a sealing cylinder, a metal sealing ring and a rubber ring; the rubber rings and the metal sealing rings are sleeve outside the protective assembly; and the sealing cylinders are sleeved outside the rubber rings and the metal sealing rings.

As an improvement of the bridge sling based on electrochemical detection on steel wire corrosion, each wire separating assembly comprises a sheath and an anchor plate; the anchor plates cover the wire outlet ends of the anchor cup bodies; a plurality of steel wire piers are arranged on the anchor plates; the sheathes are tapered; and the tail ends of the steel wire bundle penetrate through the sheathes and the plurality of steel wire piers and then are separated into a taper.

As an improvement of the bridge sling based on electrochemical detection on steel wire corrosion, each wire separating assembly further comprises a wire separating limit plate; the wire separating limit plates are sleeved at the wire inlet ends of the sheathes; and the sealing cylinders abut against the wire separating limit plates.

In order to achieve the another purpose, a technical solution adopted by the present invention is as follows:

a processing method for the bridge sling based on electrochemical detection on steel wire corrosion, comprising the following steps;

step a, wrapping the steel wire bundle with the wrapping tape to expose the two ends of the steel wire bundle, and welding the exposed ends of the steel wire bundle with a test wire;

step b: spraying a shielding coating to the outside of the wrapping tape, and welding another test wire on the shielding coating;

step c: forming a circle of inner protective layer at the exterior of the shielding coating by injection molding, and sleeving the inner protective layer with a steel pipe;

step d: sequentially sleeving the sealing cylinders and the anchor cup bodies at the tail ends of the steel pipe to seal heads of the sealing cylinders and screw the tails of the sealing cylinders with the anchor cup bodies, and electrically connecting two test wires with positive and negative electrodes of the voltmeter on the sealing cylinder respectively; and step e: dispersedly fixing the exposed portions of the steel wire bundle in the anchor cup bodies.

As an improvement of the processing method for the bridge sling based on electrochemical detection on steel wire corrosion, the step d specifically comprises: sequentially sleeving the sealing cylinders and the anchor cup bodies at the tail ends of the steel pipe, sequentially sleeving the metal sealing rings and the rubber rings outside the steel pipe from the tail ends of the steel wire bundle to seal the heads of the sealing cylinders and screw the tails of the sealing cylinders with the anchor cup bodies, and electrically connecting two test wires with the positive and negative electrodes of the voltmeter on the sealing cylinder respectively; and the step e specifically comprises: sequentially loading the tapered sheathes and the anchor plates into the anchor cup bodies, to enable the exposed portions of the steel wire bundle to penetrate through the sleeves and be dispersedly fixed on a plurality of steel wire piers of the anchor plates; and covering the tail ends of the anchor cup bodies with end caps.

Compared with the prior art, the bridge sling based on electrochemical detection on steel wire corrosion has the following beneficial technical effects:

(1) The shielding coating is arranged outside the wrapping tape of the steel wire bundle, and the steel wire bundle and the shielding coating have an electrochemical reaction with air as an electrolyte; the steel wire bundle and the shielding coating are electrically connected with the positive and negative electrodes of the voltage test assembly respectively, so that corrosion of the steel wire bundle inside the sling may be comprehensively and directly electrochemically detected, and therefore, whether the steel wire bundle inside the sling is corroded or broken is examined; and the present invention may fundamentally solve the problem of undetectable corrosion of the steel wire bundle in the sling, and whether the steel wire bundle in the sling is corroded or broken is detected by means of an electrochemical method, so that detection has the advantages of simpleness, intuition, accuracy and rapidness in operation.

(2) In the present invention, corrosion of steel wires is detected by means of the electrochemical method; the electrochemical method may reflect changes on coating performance parameters in the corroding process, and has the advantages of high real-time feature of measurement, high detection sensitivity and the like; and the shielding coating is a physical shielding layer, which can protect steel wires from corroding by preventing or delaying the air infiltration process.

(3) According to the bridge sling based on electrochemical detection on steel wire corrosion of the present invention, one end for detecting corrosion of the steel wires is in anchored connection with the bridge deck system of the arch bridge, the other end is connected with the arch rib through ear plates, and the steel wire bundle is mainly arranged between the two ends of the sling; the initial state of the steel wire bundle of the sling is that each steel wire is corrosion-free and closely connected, mutually to serve as an electrochemical positive electrode; alternating loads in a half-through arch bridge are a very common form of loads, for example, a vehicle load and a crowd load passing through the bridge, a wind load and a seismic load from the side of the bridge, etc; these alternating loads will produce certain pulsations under long-term circulation, and these pulsations can cause sling members of the bridge to produce alternating stress; next, due to the influence of the environment, some steel wires in the sling are corroded; even if the stress level is much lower than the yield limit of a material, a "fatigue" phenomenon can further occur; in essence, a fatigue damage is still a kind of damages on material strength and performance, and the principle is that under the combined action of the alternating stress and the corrosion environment, a section of sling steel wires cracks, which reduces the effective cross-sectional area and eventually leads to breakage; and when the steel wires in the sling are fatigued and corroded, the cross-sectional area and conductivity of the steel wire bundle are decreased, the electrochemical positive reaction is decreased, and the produced voltage is decreased. Therefore, when data of the voltage test assembly is significantly reduced, it indicates that some steel wires in the sling are corroded, which reminds maintenance workers to replace the sling in time.

The processing method for the bridge sling based on electrochemical detection on steel wire corrosion may quickly process bridge slings with a function of detecting corrosion and breakage of the steel wire bundle.

ILLUSTRATIONS 1. steel wire; 2. shielding coating; 3. internal protective layer; 4. steel pipe; 5. metal sealing ring; 6, rubber ring; 7. voltmeter; 81. first test wire; 81, second test wire; 9. sealing cylinder; 10. wire separating limit plate; 11. anchor cup body; 12, sheath; 13, anchor plate; 14, end cap; 15, steel wire pier.

DETAILED DESCRIPTION OF THE EMBODIMENTS

The implementations of the present invention will be explained in detail below in combination with the following drawings, which are for reference and illustration only and do not constitute a limit on the protection scope of the present invention.

Referring to FIGS. 1-10, a bridge sling based on electrochemical detection on steel wire corrosion, the basic structures of the upper and lower ends are symmetrical. The bridge sling, specifically comprises a steel wire bundle 1, a protective assembly, two sling sealing assemblies, two wire separating assemblies, two anchor cup bodies 11 and a voltage test assembly. The steel wire bundle 1 is wound with a wrapping tape (not shown); the upper and lower tail ends of the steel wire bundle 1 are exposed from the wrapping tape; the wrapping tape is coated with a shielding coating 2; the protective assembly is sleeved outside the shielding coating 2; the two sling sealing assemblies are sleeved at the upper and lower tail ends of the protective assembly respectively; the two anchor cup bodies 11 are respectively connected with the upper and lower tail ends of the two sling sealing assemblies in one-to-one correspondence; the two wire separating assemblies are respectively arranged in the two anchor cup bodies 11; two tail ends of the steel wire bundle 1 dispersedly penetrate through and are fixed on the corresponding wire separating assemblies; the voltage test assembly is arranged on the sling sealing assembly at the lower end; and the steel wire bundle 1 and the shielding coating 2 are respectively connected with positive and negative electrodes of the voltage test assembly.

Figure 1:
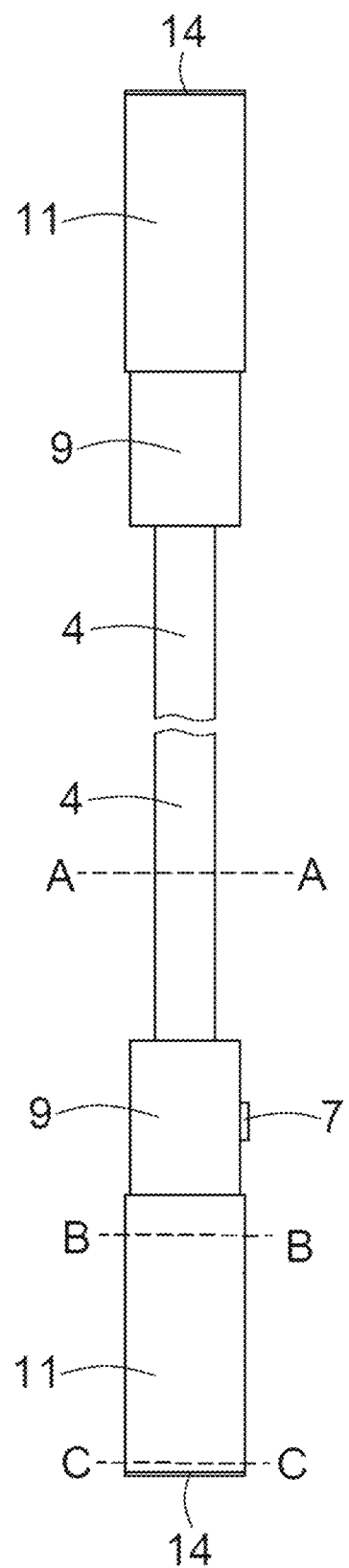
FIG. 1 is a structural schematic diagram of a bridge sling based on electrochemical detection on steel wire corrosion.
Figure 2:
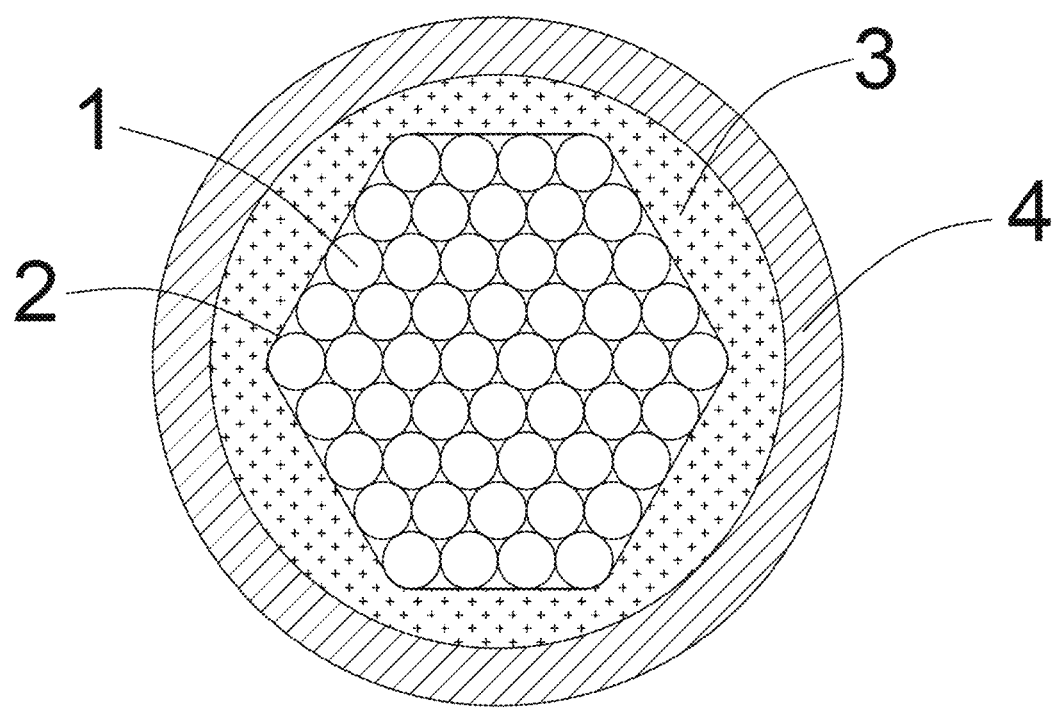
FIG. 2 is a cross-sectional view at A-A in FIG. 1.
Figure 3:
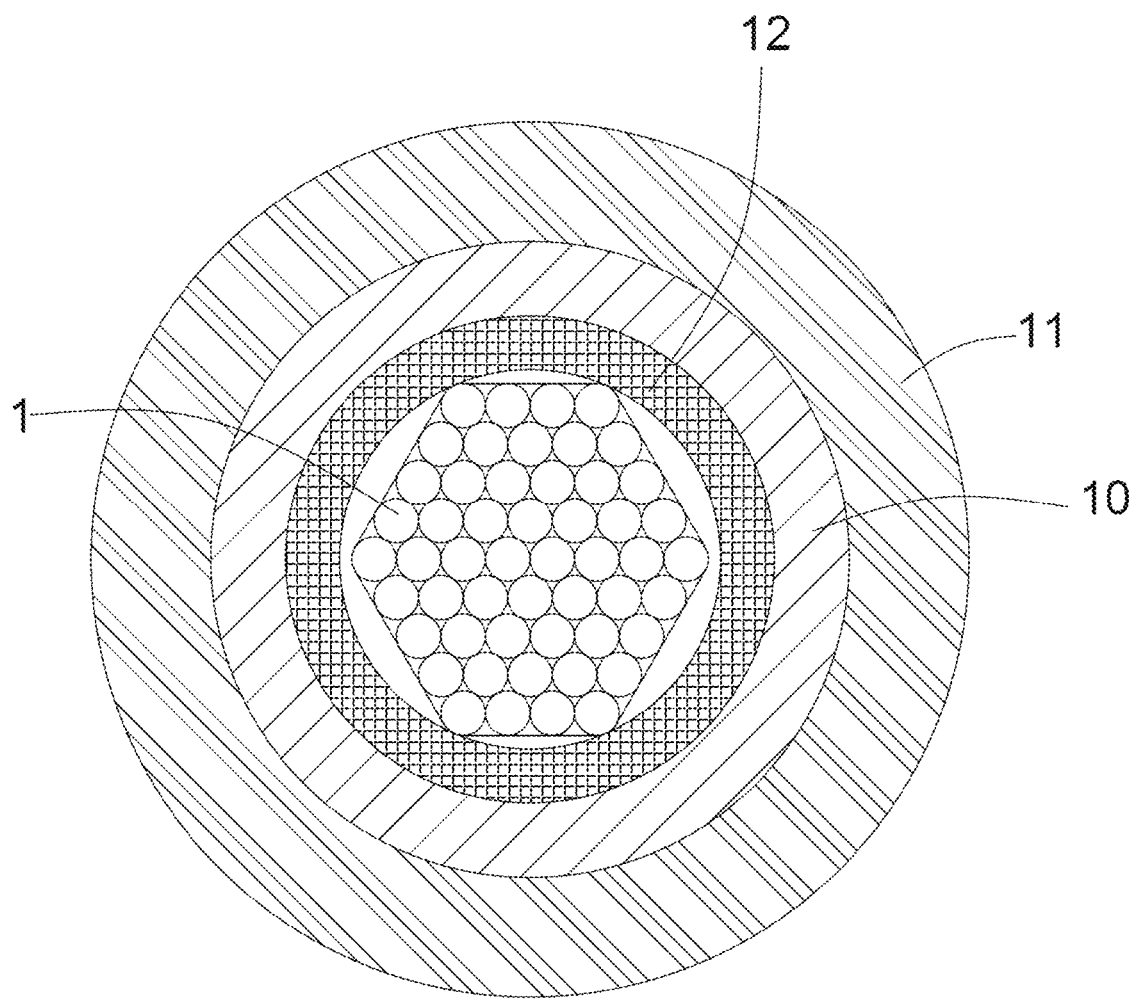
FIG. 3 is a cross-sectional view at B-B in FIG. 1.
Figure 4:
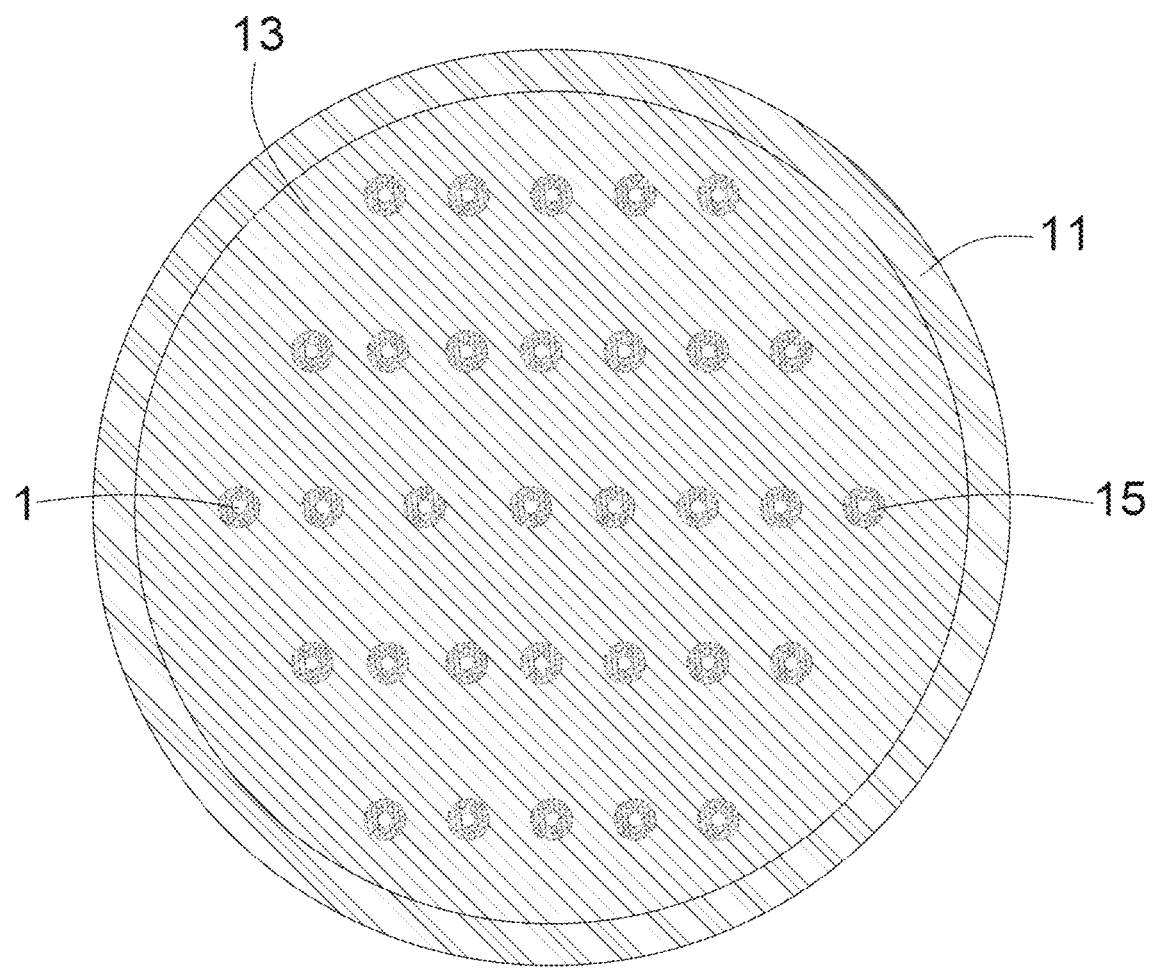
FIG. 4 is a cross-sectional view at C-C in FIG. 1.
Figure 5:
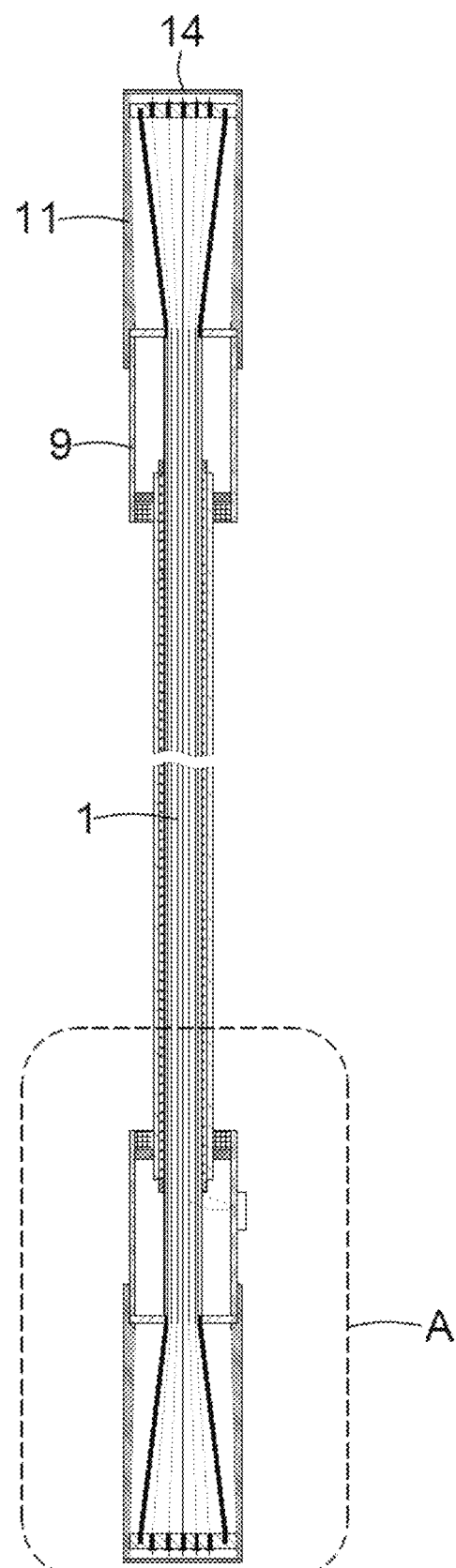
FIG. 5 is a section view of a bridge sling based on electrochemical detection on steel wire corrosion.
Figure 6:
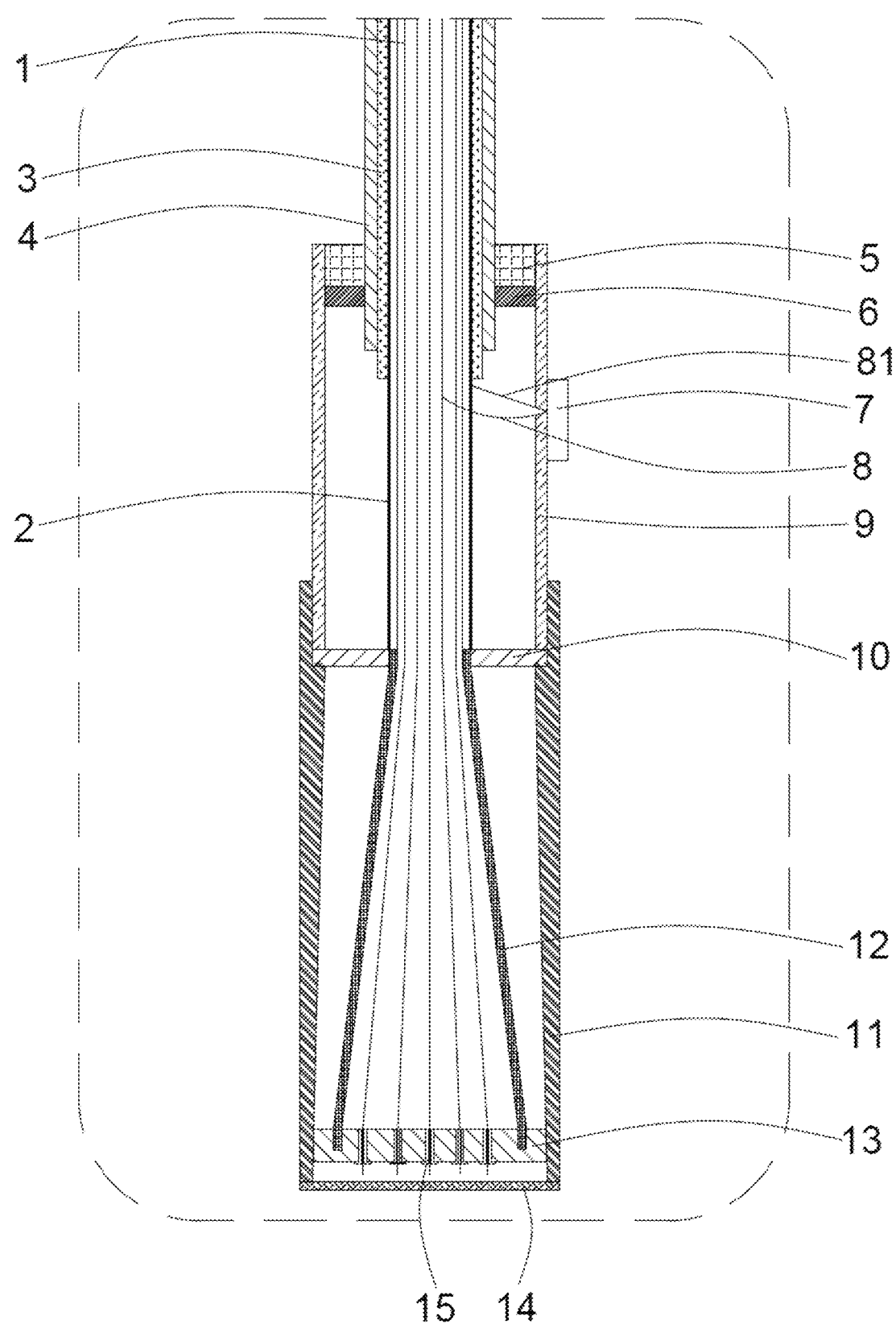
FIG. 6 is an enlarged view at A-A in FIG. 5.
Figure 7:
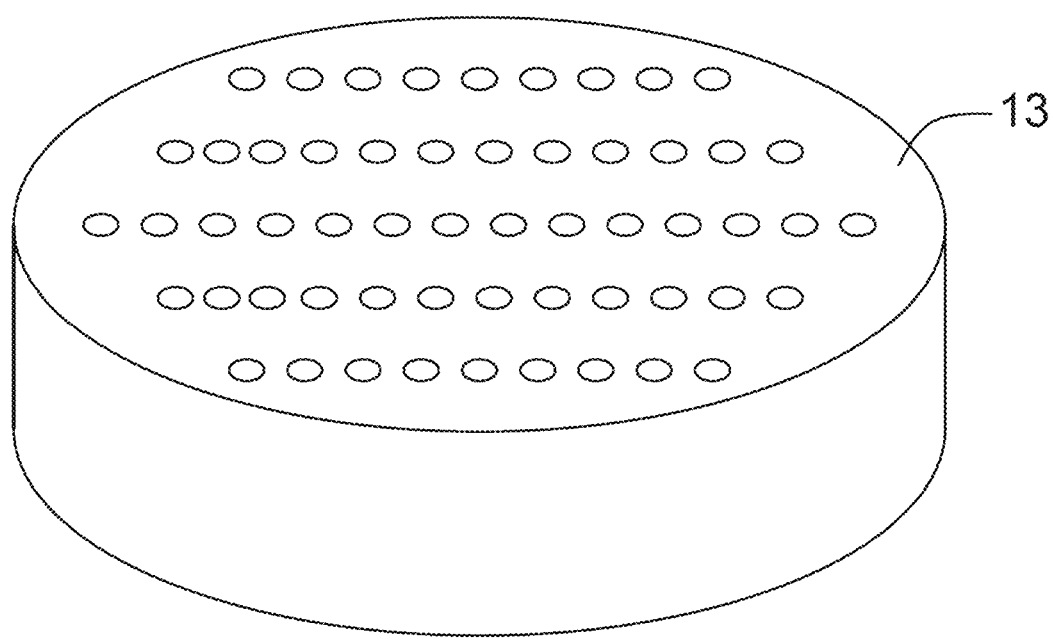
FIG. 7 is a stereo enlarged view of an anchor plate of the present invention.

Referring to FIG. 2 and FIG. 6, the steel wire bundle 1 is formed by stacking a plurality of steel wires in parallel, and the whole cross section of the steel wire bundle 1 is hexagonal; the shielding coating 2 is an organic zinc-rich coating, which has the advantages of simpleness in preparation, convenience in construction, lower requirement for the pretreatment degree of a substrate compared with an inorganic zinc-rich coating, high film hardness, strong adhesion, difficulty in cracking and damage, good matching compatibility with other coatings and the like; and the shielding layer 2 comprises zinc powder, a volatile solvent and resin, wherein the zinc powder is phosphoric acid modified zinc powder, the resin is acrylic resin, the volatile solvent is SE200 acrylic resin, and a mass ratio of the zinc powder to the resin to the volatile solvent is 1:2:2. A preparation process comprises the following steps: dispersing the SE200 acrylic resin and the quantitative solvent at 1500 rpm for 15 min, and then adding the zinc powder for continuing dispersion for 30 min to obtain the organic zinc-rich coating. The phosphoric acid modified zinc powder is prepared from ethanol, phosphoric acid and 800-mesh zinc powder according to a ratio of 9:1:10 and is prepared by the following steps: adding quantitative phosphoric acid, conducting magnetic stirring for 15 min, then adding the 800-mesh zinc powder for continuous stirring at a room temperature for 30 min; after washing with ethanol, separating and recovering the surface modified zinc powder by means of centrifugation at 3000 rpm for 3 mm; and drying the recovered modified zinc powder in an oven at 50° C. for 24 h, and then grinding and filtering the dried modified zinc powder with a 325-mesh drying screen to obtain powder for later use. The zinc powder is the phosphoric acid modified zinc powder; the phosphoric acid selects modified phosphoric acid (AR, ≥85 wt %); oiler the zinc powder is modified with phosphoric acid; the corrosion current density of zinc is greatly decreased; and the corrosion resistance of the zinc is improved. Modification with the phosphoric acid reduces the reactivity of the zinc powder and the cathodic protection effect of the coating, but greatly improves the impedance of the coating so as to improve the shielding effect of the coating. Therefore, modification with a proper concentration of phosphoric acid helps improvement on the shielding effect of the coating and the protective performance of the coating. The shielding coating 2 of the present invention is a single-component zinc-rich coating with high zinc content, which has excellent workability, is convenient for various forms of construction coating, such as air spraying, airless spraying and brushing, and may meet the design requirements of a coating thickness and a structure. The shielding coating 2 has three main protective functions in service, that is, the cathodic protection effect, the shielding effect and the self-repair effect, and may have four stages: an activation stage, a stage of cathodic protection effect being dominant, a stage of shielding effect being dominant and a failure stage. The four stages of the coating service process may be judged by means of a corrosion potential and an impedance value of the coating in an electrochemical test. Corrosion of steel wires is detected by means of the electrochemical method; the electrochemical method may reflect changes on coating performance parameters in the corrosion process, and has the advantages of high real-time feature of measurement, high detection sensitivity and the like; and the shielding coating 2 is a physical shielding layer, which can protect steel wires from corrosion by preventing or delaying the air infiltration process. Although with the increase of time, the air can always penetrate into the steel wires in the sling, before that, the coating may still be regarded as an insulation layer to isolate the air from the steel wires.

Referring to FIG. 2 and FIG. 6, the wrapping tape winds the steel wire bundle 1 and exposes the two ends of the steel wire bundle 1, and is specifically a polyester tape. The protective assembly comprises an inner protective layer 3 and a steel pipe 4, which are sequentially sleeved outside the shielding coating 2 from inside to outside; the inner protective layer 3 is made of a polypropylene plastic material and covers the steel wire bundle 1; and the steel pipe 4 is sleeved outside the inner protective layer 3.

Referring to FIG. 5, FIG. 6, FIG. 8 and FIG. 10, each sling sealing assembly comprises a sealing cylinder 9, a metal sealing ring 5 and a rubber ring 6; both the rubber ring 6 and the metal sealing ring 5 are annular and are sleeved outside the steel pipe 4; the sealing cylinder 9 is sleeved outside the rubber ring 6 and the metal sealing ring 5; and the metal sealing ring 5 and the rubber ring 6 are located on the head end face of the sealing cylinder 9, so that a good seal is formed between the heads of the sealing cylinder 9 and the steel pipe 4. Specifically, the metal sealing ring 5 and the rubber ring 6 are superposed, and the metal sealing ring 5 is located on the outer side of the rubber ring 6.

Figure 8:
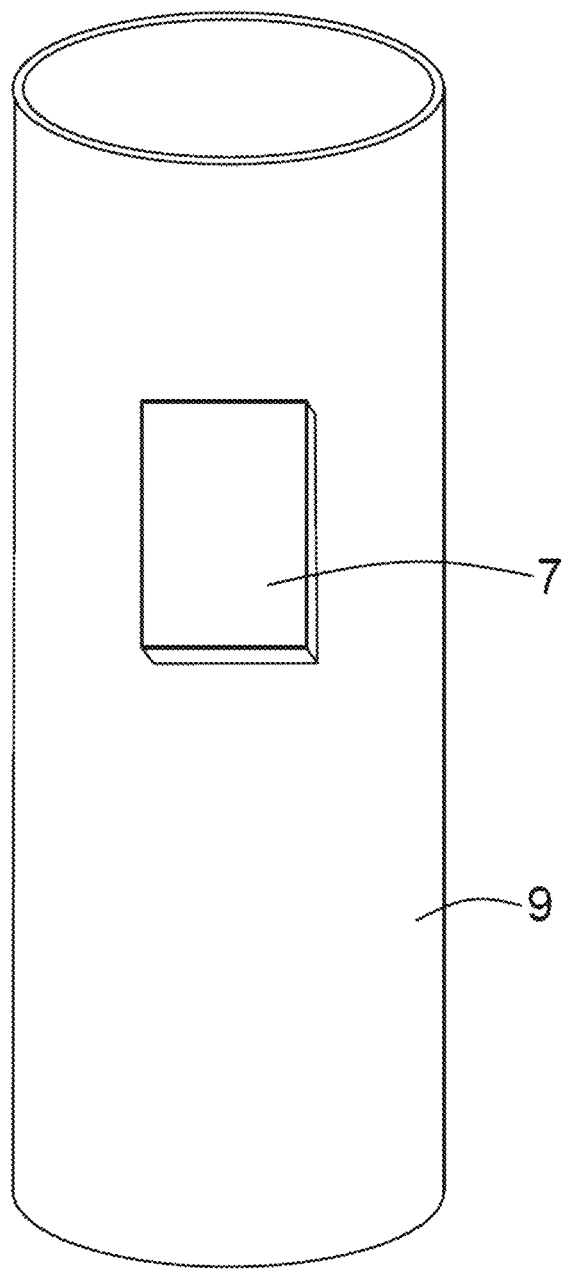
FIG. 8 is a stereo enlarged view of a sealing cylinder of the present invention.

Referring to FIG. 6 and FIG. 8, the voltage test assembly comprises a voltmeter 7 and two test wires. The voltmeter 7 is fixed on the outer wall of the sealing cylinder 9 by a chemical adhesive. The two test wires are specifically a first test wire 8 and a second test wire 81. Both the first test wire 8 and the second test wire 81 may penetrate through wire holes of the sealing cylinders 9. A positive electrode of the voltmeter 7 is wielded with one wire of the exposed portion of the steel wire bundle 1 via the first test wire 8, thereby being electrically connected with the steel wire bundle 1; a negative electrode of the voltmeter 7 is welded with the shielding coating 2 via the second test wire 81, thereby being electrically connected with the shielding coating 2. According to the bridge sling based on electrochemical detection on steel wire corrosion of the present invention, the steel wire bundle 1 and the shielding coating 2 have an electrochemical reaction with air as an electrolyte, the steel wire bundle 1 and the shielding coating 2 are respectively connected with the voltmeter 7 outside the sling sealing cylinder 9 by using test wires as wires, corrosion and breakage of the steel wire bundle 1 inside the sling may be subjected to comprehensive and direct electrochemical detection, so that whether the steel wire bundle 1 inside the sling is corroded or broken is examined; and in the present invention, the problem that the steel wire bundle 1 in the sling cannot be detected can be fundamentally solved, and whether the steel wire bundle 1 inside the sling is corroded or broken is detected by the electrochemical method, so that detection has the advantages of simpleness, intuition, accuracy and rapidness in operation.

Figure 9:
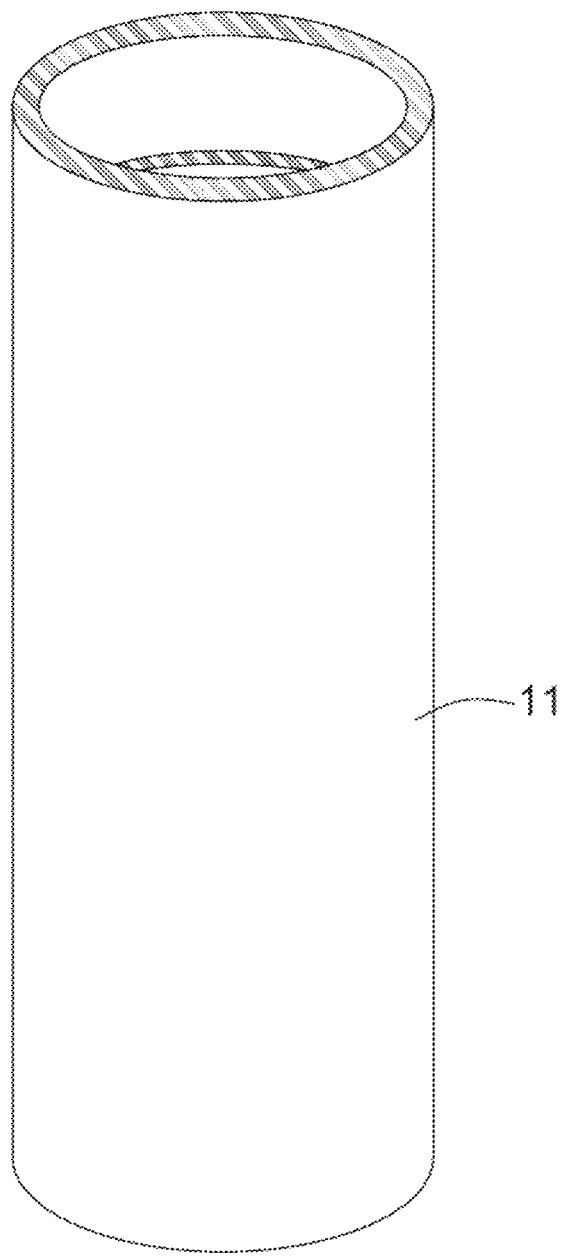
FIG. 9 is a stereo enlarged view of an anchor cup body of the present invention.
Figure 10:
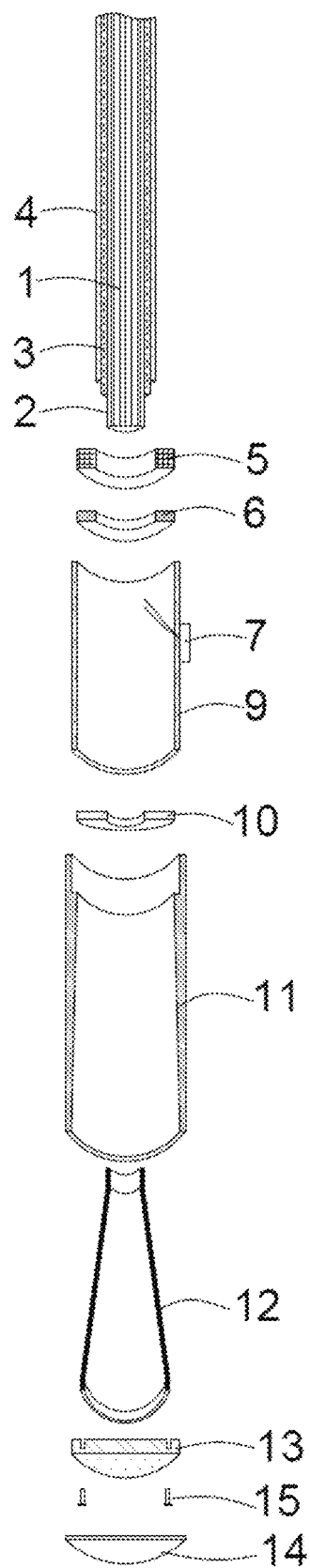
FIG. 10 is a stereo sectional view of a bridge sling based on electrochemical detection on steel wire corrosion.

Referring to FIG. 6 and FIG. 9, each anchor cup body 11 is annular, the head of the anchor cup body 11 is in threaded connection with the tail of the sealing cylinder 9, a step is arranged on the inner wall of the head of the anchor cup body 11, and the tail of the anchor cup body 11 is covered with an end cap 14.

Referring to FIG. 3, FIG. 4, FIG. 5, FIG. 7 and FIG. 9, each wire separating assembly is located in the anchor cup body 11 as a whole and comprises a sheath 12, an anchor plate 13 and a wire separating limit plate 10, wherein the sheath 12 is tapered; the wire separating limit plate 10 is annular and is sleeved at the wire inlet end of the sheath 12; the wire separating limit plate 10 is located on the step of the inner wall of the head of the anchor cup body 11; the tail of the sealing cylinder 9 extends into the anchor cup body 11 and abuts against the wire separating limit plate 10; the anchor plate 13 covers the wire outlet end of the anchor cup body 11; a plurality of holes are formed in the anchor plate 13; a steel wire pier 15 is fixed in each hole; through holes for steel wires to penetrate are formed in the steel wire piers 15; the steel wire piers 15 may be fixed at the end parts of the steel wires by means of welding or chemical bonding; and a plurality of steel wires are dispersedly fixed on the anchor plate 13 through the steel wire piers 15. Specifically, exterior threads are formed in the exterior of the steel wire piers 15; the steel wire piers 13 are fixedly connected with the anchor plates 13 by threads; and the exposed portions at the tail ends of the steel wire bundle 1 sequentially penetrate through the through holes of the sheathes 12 and the plurality of steel wire piers 15 and then are separated into a taper. This structure which is dispersedly fixed on the anchor plate 13 through the steel wire piers 15 can avoid stress concentration of the steel wires and make the stress performance of the overall structure better.

Referring to FIGS. 1-10, according to the bridge sling based on electrochemical detection on steel wire corrosion of the present invention, one end (i.e. the lower end for detecting steel wire corrosion is in anchored connection with the bridge deck system of the arch bridge, the other end (i.e. the upper end) is connected with the arch rib through ear plates, and the steel wire bundle is mainly arranged between the two ends of the sling; the initial state of the steel wire bundle 1 of the sling is that each steel wire is corrosion-free and closely connected mutually to serve as an electrochemical positive electrode; alternating loads in the half-through arch bridge are a very common form of loads, for example, a vehicle load and a crowd load passing through the bridge, and a wind load and a seismic load from the side of the bridge, etc.; these alternating loads will produce certain pulsations under the long-term circulation, and these pulsations will cause sling members of the bridge to produce alternating stress; next, due to the influence of the environment, some steel wires in the sling are corroded; even if the stress level is much lower than the yield limit of a material, a "fatigue" phenomenon can occur; in essence, a fatigue damage is still a kind of damages on material strength and performance, and the principle is that under the combined action of the alternating stress and the corrosion environment, the section of sling steel wires cracks, which reduces the effective cross-sectional area and eventually leads to breakage; when the steel wires in the sling are fatigued and corroded, the cross-sectional area and the conductivity of the steel wire bundle 1 are decreased, the electrochemical positive reaction is decreased, and the produced voltage is decreased. During detection, whether the steel wires are corroded is judged by means of a change on a numerical value of the voltmeter 7 outside the sealing cylinder 9; with regard to the zinc-rich coating, a large amount of zinc powder exits in the coating to provide cathodic protection for steel, the air contains a large amount of $CL^-$ as the electrolyte, and the voltmeter 7 tests the voltage formed between the shielding coating 2 and the steel wire bundle 1; whether the steel wires in the tested steel wire bundle 1 are corroded is displayed according to a reading of the voltmeter 7; and if data of the voltmeter 7 is significantly reduced, it indicates that partial steel wires in the steel wire bundle 1 are corroded, which reminds maintenance workers to replace the sling in time.

Specifically, each anchor cup body 11 is tapered inside and has the same size as the exterior of the sheath 12. When the tension of the steel wires exerts pressure on the end part of the sheath 12, the anchor cup body 11 resists the pressure from the sheath 12, and anchoring force of a sling anchor is improved. The sheathes 12 are made of steel; the anchor plates 13 are steel plates with holes; the number of holes is the same as that of the steel wires; and the end caps 14 are made of steel.

Referring to FIGS. 1-10, a processing method for the bridge sling based on electrochemical detection on steel wire corrosion, comprising the following steps:

Step a, wrapping the steel wire bundle 1 with the wrapping tape to expose the two ends of the steel wire bundle 1, and welding the exposed end of the steel wire bundled with the test wire 8;

step b: spraying the shielding coating 2 to the outside of the wrapping tape, and welding the second test wire 81 on the shielding coating 2;

step c: moving the steel wire bundle 1 to the head of an extrusion molding machine, and covering the shielding coating 2 outside the wrapping tape with the polypropylene material sent from the extrusion molding machine, forming a circle of internal protective layer 3 outside the shielding coating 2 by means of injection molding, and sleeving the steel pipe 4 outside the inner protective layer 3;

step d: processing the sealing cylinders 9, the wire separating limit plates 10 and the anchor cup bodies 11, placing the wire separating limit plates 10 between the sealing cylinders 9 and the anchor cup bodies 11, sequentially sleeving the sealing cylinders 9 and the anchor cup bodies 11 at the two tail ends of the steel pipe 4, sequentially sleeving the metal sealing rings 5 and the rubber rings 6 outside the steel pipe 4 from the tail ends of the steel wire bundle with to seal the heads of the sealing cylinders 9 and screw the tails of the sealing cylinders 9 with the anchor cup bodies 11, and enabling the first test wire 8 and the second test wire 81 to penetrate through the wire holes in the sealing cylinders 9, so as to electrically connect the first test wire 8 with the positive electrode of the voltmeter 7 and electrically connect the shielding coating 2 with the negative electrode of the voltmeter 7; and step e: sequentially loading the tapered sleeves 12 and the anchor plates 13 into the anchor cup bodies 11, to enable the exposed portions of the steel wire bundle 1 to penetrate through the sheathes 12 and be dispersedly fixed on the plurality of steel wire piers 15 of the anchor plates 13; and finally, using the end caps 14 for sealing, covering the tail ends of the anchor cup bodies 11 with the end caps 14, and enabling the end caps 14 to be in threaded connection with the anchor cup bodies 11.

The disclosure is merely the preferred embodiment of the present invention, which should not be used to limit the scope of protection of the claims of the present invention. Therefore, the equivalent changes, made in the scope of the present application according to the present invention are still within the scope of the present invention.

What is claimed is:

1. A bridge sling configured for electrochemical detection of steel wire corrosion, including a steel wire bundle, wherein the steel wire bundle is wound with a wrapping tape; the tail ends of the steel wire bundle are exposed from the wrapping tape; the wrapping tape is coated with a shielding coating; a protective assembly is sleeved outside the shielding coating; sling sealing assemblies are sleeved at the tail ends of the protective assembly; the tail ends of the sling seal assemblies are connected with anchor cup bodies; wire separating assemblies are arranged in the anchor cup bodies; the tail ends of the steel wire bundle dispersedly penetrate through and are fixed on the wire separating assemblies; a voltage test assembly is arranged on the sling sealing assembly; and the steel wire bundle and the shielding coating are electrically connected with positive and negative electrodes of the voltage test assembly respectively;

wherein the steel wire bundle is formed by stacking a plurality of steel wires in parallel; the shielding coating is an organic zinc-rich coating; and the wrapping tape is a polyester tape.

2. The bridge sling configured for electrochemical detection of steel wire corrosion according to claim 1, wherein the voltage test assembly includes a voltmeter; the positive electrode of the voltmeter is electrically connected with the steel wire bundle; and the negative electrode of the voltmeter is electrically connected with the shielding coating.

3. The bridge sling configured for electrochemical detection of steel wire corrosion according to claim 1, wherein the organic zinc-rich coating includes zinc powder, a volatile solvent and resin; the zinc powder is phosphoric acid modified zinc powder; the volatile solvent is SE200 acrylic resin; the resin is acrylic resin; and a mass ratio of the zinc powder to the resin to the volatile solvent is 1:2:2.

4. The bridge sling configured for electrochemical detection of steel wire corrosion according to claim 1, wherein the protective assembly includes an inner protective layer and a steel pipe; the inner protective layer and the steel pipe are sleeved outside the shielding coating from inside to outside sequentially; and the inner protective layer is made of a plastic material.

5. The bridge sling configured for electrochemical detection of steel wire corrosion according to claim 1, wherein each sling sealing assembly includes a sealing cylinder, a metal sealing ring and a rubber ring; the rubber rings and the metal sealing rings are sleeved outside the protective assembly; and the sealing cylinders are sleeved outside the rubber rings and the metal sealing rings.

6. A processing method for a bridge sling configured for electrochemical detection of steel wire corrosion, including the following steps:

step a, wrapping a steel wire bundle with a wrapping tape to expose the two ends of the steel wire bundle, and welding the exposed ends of the steel wire bundle with a test wire;

step b: spraying a shielding coating to the outside of the wrapping tape, and welding another test wire on the shielding coating;

step c: forming a circle of inner protective layer at the exterior of the shielding coating by injection molding, and sleeving the inner protective layer with a steel pipe;

step d: sequentially sleeving the tail ends of the steel pipe with sealing cylinders and anchor cup bodies for sealing heads of the sealing cylinders, and for screwing tails of the sealing cylinders with the anchor cup bodies, and electrically connecting two test wires with positive and negative electrodes of a voltmeter on the sealing cylinder respectively; and step e: dispersedly fixing the exposed portions of the steel wire bundle in the anchor cup bodies.

* * * * *